SAMUEL S. INGALLS.
Improvement in Apparatus for Checking Horses.
No. 125,052. Patented March 26, 1872.

Witnesses. Inventor.

125,052

UNITED STATES PATENT OFFICE.

SAMUEL S. INGALLS, OF CHICAGO, ILLINOIS.

IMPROVEMENT IN APPARATUS FOR CHECKING HORSES.

Specification forming part of Letters Patent No. 125,052, dated March 26, 1872; antedated March 19, 1872.

*To all whom it may concern:*

Be it known that I, SAMUEL S. INGALLS, of Chicago, county of Cook, State of Illinois, have invented a new and useful Improvement in Horse-Check, of which the following is a full, clear, and exact description, reference being had to the accompanying drawing making part of this specification, in which—

Figure 1:
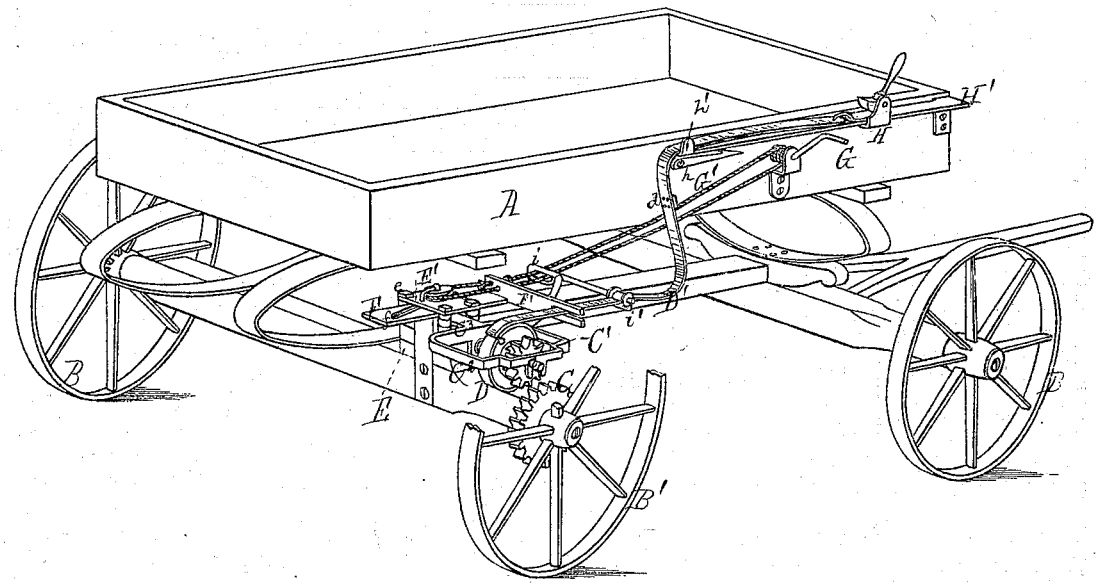
Figure 2:
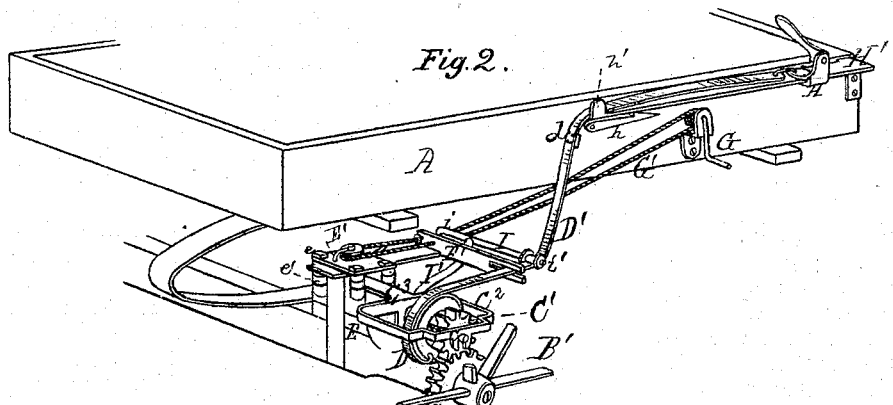
Figure 3:
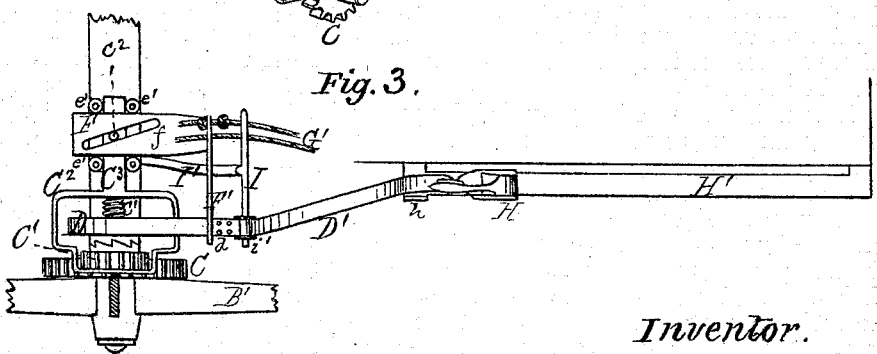

Figure 1 represents the devices in the position which they occupy when the wagon is being driven under ordinary circumstances, with the cogged gear out of mesh. Fig. 2 represents the gears in mesh, as they are when the team is to be left alone; and Fig. 3 is a plan or top view, with the cap-plate removed, showing the position of the parts when the team has moved the wagon far enough to tighten up the lines to the utmost limit.

Similar letters of reference denote corresponding parts in all the figures.

The invention relates to the construction of devices adapted to prevent horses from running away, when they are left alone, with a wagon attached, where it is not convenient to hitch them to a post; and it consists in certain new features, both of construction and combination of parts, whereby the devices are made to be automatic in certain operations, as will be hereinafter explained.

In the drawing, A represents the body of a wagon, and B B' the wheels. C is a cogged gear, attached to hind wheel B'. C¹ is another cog-wheel, rigidly attached to a shaft, $c$, mounted in a frame or bracket, C². This frame is rectangular in form, and is made in one piece with or attached to a shank, C³, shown plainly in Figs. 2 and 3, and has a reciprocating motion imparted to it by means of devices which will be described.

D is a drum or roller, provided, by preference, with flanges to more effectually retain the strap D', which is wound upon it when the devices are in operation. This pulley runs loosely upon shaft $c$, and is connected with gear C¹ by means of a backing-ratchet, being held in place by a spiral spring, $c^1$, (see Fig. 3.) E is a base-plate, and E' a cap-plate, secured to each other by four bolts, $e$, one at each corner. $e'$ are friction-rollers, of which there are two, of about the same diameter and thickness, upon each bolt or post, between the plates E E'. The shank C³ of frame C² is of such width that it can be easily placed between the two lower pairs of rollers $e'$, resting upon base-plate E, and sliding readily in and out on a line with the axle of the wagon. F is a shifting plate, lying between the upper pairs of rollers $e'$ and resting upon shank C³, being held in place by cap-plate E'. Plate F has a reciprocating motion at right angles to that of shank C³, and is provided centrally with a diagonal slot, $f$, shown plainly in Figs. 1 and 3. Shank C³ has a pin, $c^2$, projecting from its upper face and engaging with slot $f$, as in Fig. 3; hence, when shifting plate F is moved backward, shank C³ and frame C², together with gear C¹ and pulley D, are drawn inward into the position shown in Fig. 1, as will be readily seen by reference to the drawing, without further explanation; and a forward movement of plate F will throw the frame-wheel and pulley outward. Plate F is moved forward, as follows: G is a crank, mounted on the side of the box, and actuates a shaft, around which is wound an endless rope, G'. This rope passes from the crank-shaft through a guide-loop, $i$, and around a loose grooved guiding-pulley or sheave on cap-plate E'. One line of this rope is attached to a cross-bar, F', on one end of shifting plate F; the other line passing freely through said bar F', as shown in the drawing, or above it or below it, as may be found most convenient. It will be at once apparent that plate F may be moved forward or backward, and, of course, frame C² moved in or out, by merely turning crank G in one direction or in the other, at the will of the driver. The strap D' passes from drum D through a slot in the outer end of cross-bar F', thence through another guide-loop, $i'$, and is fastened to a rein-holder, H, which slides upon a way, H', projecting from the side of the wagon-box A. $h$ is a spring-latch, applied to the lower side of way H' in such manner that it will engage with and hold rein-holder H, when it (the holder) shall be drawn back to the rear end of the way. The way H' is provided with an upturning lip or ear, $h'$, which serves to keep in place strap D', which passes up over the rear end of said way. The rod I, the ends of which form guide-loops $i\ i'$, is supported from base-plate E by means of an arm, I', (see Figs. 2 and 3;) and, by preference, I provide loop $i'$ with a friction-roller, as shown in the drawing. $d$ is a stop or catch applied to strap D'.

The operation of my device is as follows: Supposing the parts to be in the position shown in Fig. 1, (the ordinary position when not in use,) and I wish to leave the horse alone, I secure the reins in the rein-holder H, care being taken that they do not draw upon the bit so as to make the team restive. I then draw shifting plate F forward by means of crank G, thereby throwing cog-wheel $C^1$ into mesh with gear C. If now the horses attempt to run, the forward rotation of wheel B' will wind up strap D' upon drum D, thereby drawing back rein-holder H, the tension upon the lines increasing with each step. But under some circumstances the team might persist in going forward until the strain broke the lines, when they would be left without any restraint, if the winding-up process were suffered to go on indefinitely. To guard against this emergency I have so constructed the parts that, as strap D' is moving through the slot in the outer end of cross-bar F', stop or catch $d$ shall engage with said arm and draw the shifting plate F backward, and throw cog-wheel $C^1$ out of gear when rein-holder H has passed catch $h$, the parts now being in the position shown in Fig. 3. By this arrangement of parts the liability of breaking the lines is removed, while at the same time a proper tension upon them is maintained. The driver can loosen his lines by tripping-latch $h$, and resume his journey, leaving the rein-holder at either the front or rear end of way H. I prefer, however, to leave it at the front end, as the drum is apt to unwind and let the strap hang down loosely. The backing-ratchet, between the drum D and gear $C^1$, will prevent any injury to the parts from the team backing up at any time. The base-plate E furnishes a support for all of the mechanism which is mounted upon the axle, and may be secured to said axle by a strap, J, or in any other convenient manner; and it will be found that this method of supporting all of these devices upon one plate facilitates applying the checks to wagons of different kinds. The guide-loops $i\ i'$ cause the endless rope G' and strap D' to travel in the same line or plane with plate F and cross-bar F', and thus relieves the parts from cramping.

In applying my improved check to buggies and such other vehicles as are not adapted to receive the bar or way H', upon which the rein-holder slides, I usually employ a ring or other suitable guide for support of the free end of strap D'. This guide should be attached to the seat or body in such position that the strap may be wound up far enough to let the stop $d$ throw the mechanism out of gear before the rein-holder comes in contact with it, (the guide;) and when preferred said guide may be provided with a clasp, or equivalent device, which will hold the rein-holder after it has been drawn back, thus performing the function of spring-latch $h$.

Having thus described my invention, what I claim as new, and desire to secure by Letters Patent, is—

1. In a horse-check, in combination with gears C $C^1$ and drum D, an automatic shifting device, adapted to stop the winding-up movement of the drum when the reins have been drawn back a certain distance.

2. In combination with the sliding rein-holder H, the spring-latch $h$, substantially as set forth.

3. In combination with the device for throwing the cogged gears into and out of action, the endless rope G' and crank G for operating said devices, substantially as set forth.

4. In combination with strap D' or rope G' and cross-bar F', the guiding loop or loops to relieve the parts from cramping, substantially as set forth.

In testimony whereof I have hereunto set my hand this 31st day of August, A. D. 1871.

SAMUEL S. INGALLS.

Witnesses:
   L. R. CARPENTER,
   S. E. ROCKWELL.